United States Patent [19]

Shipley et al.

[11] 4,238,355

[45] Dec. 9, 1980

[54] HIGH EFFICIENCY CATALYST FOR POLYMERIZING OLEFINS

[75] Inventors: Randall S. Shipley, Alvin; Donald F. Birkelbach, Angleton; Kirby Lowery, Jr., Lake Jackson, all of Tex.

[73] Assignee: The Dow Chemical Company, Midland, Mich.

[21] Appl. No.: 74,037

[22] Filed: Sep. 10, 1979

Related U.S. Application Data

[63] Continuation-in-part of Ser. No. 939,636, Sep. 5, 1978, abandoned.

[51] Int. Cl.$^3$ .............................................. C08F 4/64
[52] U.S. Cl. ................................. 252/429 B; 252/428; 242/429 C; 252/430; 252/431 C; 526/114; 526/122; 526/128; 526/134; 526/151; 526/153; 526/158; 526/159; 526/163
[58] Field of Search ............... 252/429 B, 249 C, 428, 252/430, 431 C

[56] References Cited

U.S. PATENT DOCUMENTS

| | | | |
|---|---|---|---|
| 3,066,126 | 11/1962 | Porter et al. | 252/429 C X |
| 3,068,180 | 12/1962 | van Amerongen et al. | |
| 3,207,741 | 9/1965 | Schafer et al. | |
| 3,215,682 | 11/1965 | Farrar et al. | |
| 3,458,493 | 7/1969 | Gaeth et al. | |
| 3,489,731 | 1/1970 | Imoto et al. | |
| 3,728,283 | 4/1973 | Chauvin et al. | |
| 3,959,239 | 5/1976 | Butter et al. | |
| 3,989,878 | 11/1976 | Aishima et al. | |
| 4,006,101 | 2/1977 | Matsuuka et al. | |
| 4,067,822 | 1/1978 | Gessell et al. | |
| 4,091,082 | 5/1978 | Gessell et al. | 252/429 B X |
| 4,104,198 | 8/1978 | May et al. | 252/429 C X |
| 4,120,820 | 10/1978 | Birkeleach | 252/429 B |
| 4,163,831 | 8/1979 | Gessell | 252/429 C X |
| 4,172,050 | 10/1979 | Gessell | 252/429 C X |

FOREIGN PATENT DOCUMENTS

| | | |
|---|---|---|
| 49-14348 | 4/1974 | Japan . |
| 1492379 | 11/1977 | United Kingdom . |
| 1500873 | 2/1978 | United Kingdom . |

*Primary Examiner*—Patrick Garvin
*Attorney, Agent, or Firm*—J. G. Carter

[57] ABSTRACT

Compositions exhibiting high catalytic activity in the polymerization of α-olefins, particularly higher olefins, are prepared by reacting tetravalent or trivalent titanium compounds such as a titanium tetraalkoxide, an anhydrous zinc compound such as diethyl zinc, an organomagnesium component such as a hydrocarbon soluble complex of dialkyl magnesium and an alkyl aluminum and a halide source such as a hydrogen halide or an alkyl aluminum halide and an aluminum compound if the halide source of organomagnesium component does not contain sufficient quantities of aluminum. Polymerization processes employing this catalyst composition do not require conventional catalyst removal steps in order to provide polymers having suitable color and other physical characteristics and these catalysts produce polymers having broader molecular weight distributions than do corresponding catalysts without the anhydrous zinc compound.

14 Claims, No Drawings

HIGH EFFICIENCY CATALYST FOR POLYMERIZING OLEFINS

CROSS REFERENCE TO RELATED APPLICATION

This application is a continuation-in-part of copending application Ser. No. 939,636 filed Sept. 5, 1978 and now abandoned.

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene and 1-butene in the presence of metallic catalysts, particularly the reaction products of organometallic compounds and transition metal compounds, can be polymerized to form substantially unbranched polymers of relatively high molecular weight. Typically such polymerizations are carried out in relatively low temperatures and pressures.

Among the methods of producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups IVB, VB, VIB and VIII of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g. an aliphatic hydrocarbon, and the aforementioned catalyst. One or more olefins may be brought into contact with the reaction medium in any suitable manner. A molecular weight regulator, which is normally hydrogen, is usually present in the reaction vessel in order to suppress the formation of undesirable high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization are generally believed to be caused by the general tendency of such catalysts to become rapidly depleted or deactivated by the significantly higher temperatures that are normally employed in solution processes. In addition, processes involving the copolymerization of ethylene with higher α-olefins exhibit catalyst efficiencies significantly lower than ethylene homopolymerization processes.

Recently, catalysts having higher efficiencies have been disclosed, e.g., U.S. Pat. Nos. 3,392,159, 3,737,393, West German Patent Application 2,231,982 and British Pat. Nos. 1,305,610 and 1,358,437. While the increased efficiencies achieved by using these recent catalysts are significant, even higher efficiencies are desirable, particularly in copolymerization processes. These high efficiency catalysts generally produce polymers of relatively narrow molecular weight distribution. It is therefore desirable to have, for some applications such as for use in film applications and injection molding, high efficiency catalysts which produce polymers and copolymers having a broader molecular weight distribution.

In view of the foregoing problems encountered in the use of conventional Ziegler catalysts, it would be highly desirable to provide a polymerization catalyst that is sufficiently active, even at solution polymerization temperature above 140° C., to produce such high quantities of olefin homopolymers or copolymers per unit of catalyst that it is no longer necessary to remove catalyst residue in order to obtain a polymer of the desired purity.

SUMMARY OF THE INVENTION

The present invention, in one aspect, is the catalytic reaction product of (A) a tetravalent titanium compound or a complex of a trivalent titanium compound with an electron donor, (B) an anhydrous divalent zinc compound, (C) an organomagnesium component and (D) a halide source. If components (C) and/or (D) do not contain sufficient quantities of an aluminum compound, then additional quantities of an organoaluminum compound should be added. the magnesium component is (1) a complex of an organomagnesium compound and an organometallic compound which solubilizes the organomagnesium compound in a hydrocarbon solvent or (2) an organomagnesium compound. The halide source is a non-metallic halide corresponding to the formula R'X wherein R' is hydrogen or an active monovalent organic radical and X is halogen. Alternatively, the halide source is a metallic halide corresponding to the formula $MR_{y-a}X_a$ wherein M is a member selected from Group IIB, IIIB or IVB of Mendeleev's Periodic Table of the Elements, R is a monovalent organic radical, usually hydrocarbyl or hydrocarbyloxy, X is halogen, y is a number corresponding to the valence of M and a is a number from 1 to y. The proportions of the foregoing components of said catalytic reaction products are such that the atomic ratios of the element are:

Mg:Ti is from about 1:1 to about 2000:1; preferably from about 2:1 to about 200:1; most preferably from about 5:1 to about 75:1;

Al:Ti is from about 0.1:1 to about 2000:1; preferably from about 0.5:1 to about 200:1; most preferably from about 1:1 to about 75:1;

Zn:Ti is from about 0.1:1 to about 200:1; preferably from about 0.5:1 to about 100:1; most preferably from about 0.5:1 to about 75:1;

excess X:Al is from about 0.0005:1 to about 10:1; preferably from about 0.002:1 to about 2:1; most preferably from about 0.01:1 to about 1.4:1.

The excess X is the quantity of halide above that which would be theoretically required to convert the magnesium compound to the dihalide.

In a second aspect, the invention is a process for polymerizing at least one α-olefin under conditions characteristic of Ziegler polymerization wherein the aforementioned reaction product is employed as the sole catalyst when such contains aluminum or if the catalyst does not contain aluminum or it contains an insufficient quantity of aluminum, then there is additionally employed an organometallic compound containing aluminum.

In view of the reduced activity of conventional Ziegler catalysts in the copolymerization of α-olefins, particularly at solution polymerization temperatures, it is indeed surprising that the aforementioned catalytic reaction product is a high efficiency catalyst capable of producing more than a million pounds of olefin polymer or copolymer per pound of transition metal under such polymerization conditions. Accordingly, olefin polymers produced in accordance with the foregoing process generally contain lower amounts of catalyst residues than polymers produced in the presence of conventional catalyst even after subjecting such conventionally produced polymers to catalyst removal treatments. Further, these catalytic reaction products provide polymers produced therefrom with a relatively broader molecular weight distribution than do corresponding catalysts without the anhydrous zinc compound.

DETAILED DESCRIPTION OF THE PREFERRED EMBODIMENTS

The present invention is most advantageously practiced in a polymerization process wherein an α-olefin is polymerized, generally in the presence of hydrogen as a molecular weight control agent, in a polymerization zone containing an inert diluent and the catalytic reaction product as hereinbefore described. Especially advantageous is the copolymerization of ethylene and higher α-olefins using the catalytic reaction product of this invention. The foregoing polymerization process is most beneficially carried out under inter atmosphere and relatively low temperature and pressure, although very high pressures are optionally employed.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with other α-olefins and/or with small amounts, e.g., up to about 25 weight percent based on the polymer, of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.1 to about 40, weight percent of propylene, butene-1, hexene-1, octene-1, 4-methylpentene-1, 1,7-octadiene or similar α-olefin or diolefin based on total monomer.

Suitable zinc compounds which can be advantageously employed include those zinc compounds represented by the formula $Zn(Q)_m$ wherein Q is an anion such as, for example, a halide such as chloride or bromide, hydroxide, carboxylate, carbonate, nitrate, sulfate, mixtures thereof and the like and m is two (2) divided by the valence of Q. Preferably zinc compounds represented by the formula $R_2Zn$ or $RZnX$ wherein R and X are independently, as hereinafter defined, employed. Particularly suitable zinc compounds include, for example, diethyl zinc, diphenyl zinc, ethyl zinc chloride, mixtures thereof and the like.

Advantageously, the tetravalent titanium compound is represented by the empirical formula: $TiX_n(OR)_{4-n}$ wherein X is a halogen, particularly chlorine or bromine, R is an alkyl or an aryl group having from 1 to 12 carbon atoms and n has a value of 0 to 4. Such titanium compounds are preferably derived from the titanium halides wherein one or more of the halogen atoms are replaced by an alkoxy or aryloxy group. Exemplary of such compounds include tetra-n-butoxy titanium, di-n-butoxy titanium dichloride, monoethoxy titanium trichloride, tetraphenoxytitanium and the like.

Advantageously, the trivalent titanium complexes are represented by the empirical formula: $TiZ_3(L)_x$ wherein Z is halide, and L is an electron donating compound such as water or an organic electron donor, e.g., alcohol, ether, ketone, amine or olefin, and x is a number from 1 to 6. Usually, the organic electron donor has from 1 to 12 carbon atoms and donates an unshared pair of electrons to the complex. In preferred complexes, Z is chloride or bromide, most preferably chloride, and L is alcohol, especially an aliphatic alcohol having 2 to 8 carbon atoms and most preferably 3 to 6 carbon atoms such as isopropyl alcohol, n-propyl alcohol, n-butyl alcohol and isobutyl alcohol. While the exact structure of the complexes are not known, they are believed to contain 3 valence bonds to the halide ions and 1 to 6, preferably 2 to 4, coordination bonds to the electron donating compound. The titanium halide complexes are most advantageously prepared by heating the trivalent titanium halide dispersed in the electron donating compound under nitrogen or similar inert atmosphere. Usually the formation of the complex is visually indicated by a definite change in color. For example, when the dark purple, α-TiCl₃ is heated in anhydrous isopropyl alcohol under nitrogen, complex formation is indicated by the formation of a brilliant blue solution. The complexes are normally solid; however, liquid complexes would be suitable.

In addition to α-TiCl₃, the Δ, γ and β crystalline forms of titanium trichloride are advantageously employed in the preparation of the complex. Also suitable are titanium tribromide, titanium trifluoride and the like. Of the foregoing, the Δ- and α-forms of titanium trichloride are preferred. Exemplary electron donating compounds suitably employed include aliphatic alcohols, e.g., isopropyl alcohol, ethanol, n-propyl alcohol, butanol and others having from 1 to 10 carbon atoms; ethers; ketones; aldehydes; amines; olefins, and the like having from 1 to 12 carbon atoms and water.

The preferred organomagnesium component is a hydrocarbon soluble complex illustrated by the formula $MgR''_2 \cdot xMR''_y$ wherein R'' is independently hydrocarbyl or hydrocarbyloxy, M is aluminum, zinc or mixtures thereof and x is about 0.001 to 10, especially from about 0.15 to about 2.5 and y denotes the number of hydrocarbyl groups which corresponds to the valence of M. As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms being preferred. Hydrocarbyl is preferred over hydrocarbyloxy. This complex is prepared by reacting particulate magnesium such as magnesium turnings or magnesium granules, magnesium powder and the like with about a stoichiometric amount of hydrocarbyl halide, illustrated as R'X. The resulting hydrocarbon insoluble $MgR''_2$ is solubilized by adding the organometallic compound such as $AlR''_3$ or mixtures thereof with $ZnR''_2$. The amount of organometallic compounds which is added to the $MgR''_2$ to form the organomagnesium complex should be enough to solubilize a significant amount (at least about 5 weight percent) of $MgR''_2$. It is preferred to solubilize at least about 50 weight percent of the $MgR''_2$ and it is especially preferred to solubilize all the $MgR''_2$. When employing a mixture of $AlR''_3$ and $ZnR''_2$ to solubilize $MgR''_2$, the atomic ratio of Zn to Al is from about 3000:1 to about 0.1:1, preferably from about 350:1 to about 1:1. In order to obtain maxiumum catalyst efficiency at polymerization temperatures above 180° F., it is desirable to minimize the amount of aluminum in the complex as well as in the total catalyst. Accordingly, for catalysts having Al:Ti atomic ratios less than 120:1, it is desirable to have a Mg:Al atomic ratio more than 0.3:1, preferably from about 0.5:1 to 10:1. In suitable complexes, organometallic compounds (other than $AlR''_3$, $ZnR''_2$ or mixtures thereof) which also solubilize the organomagnesium compound in hydrocarbon are employed in beneficial amounts, usually an amount sufficient to produce an atomic ratio of 0.01:1 to 10:1 of metal of the organometallic compounds to magnesium. Examples of such other organometallic compounds include boron trialkyls such as boron triethyl, alkyl silanes such as dimethyl silane and tetraethyl silane, alkyl tin and alkyl phosphorous compounds.

Alternative to the aforementioned solubilized magnesium complexes, it is also advantageous to employ organomagnesium compounds as the organomagnesium component. Such compounds, although often insoluble in hydrocarbon, are suitably employed. These compounds can be rendered soluble in hydrocarbon by addition of ether, amine, etc., although such solubilizing agents often reduce the activity of the catalyst. Recently, such compounds have been made hydrocarbon soluble without using such catalyst poisons, e.g., as taught in U.S. Pat. No. 3,646,231. The more recent hydrocarbon soluble organomagnesium compounds are the most desirable if an organomagnesium compound is to be used as the organomagnesium component.

Preferably the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein the alkyl has from 1 to about 20 carbon atoms. Exemplary suitable magnesium diaryls include diphenylmagnesium, dibenzylmagnesium, and ditolylmagnesium, being especially preferred. Suitable organomagnesium compounds include alkyl and aryl magnesium alkoxides and aryloxides and aryl and alkyl magnesium halides with the halogen-free organomagnesium compounds being more desirable.

The preferred halide sources are the active non-metallic halides of the formula set forth hereinbefore including hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride and preferably as active as t-butyl chloride. In addition to the organic monohalides, it is understood that organic dihalides, trihalides and other polyhalides that are active, as defined hereinbefore, are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides as set forth by formula hereinbefore are organometallic halides and metal halides wherein the metal is in Group IIB, IIIA or IVA of Mendeleev's Periodic Table of Elements. Preferred metallic halides are aluminum halides of the formula $AlR_{3-a}X_a$ wherein each R is independently hydrocarbyl as hereinbefore defined such as alkyl, X is a halogen and a is a number from 1 to 3. Most preferred are alkylaluminum halides such as ethylaluminum sesquichloride, diethylalumiunum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R'', and the organic moieties of the halide source, e.g., R and R', are suitably any other organic radical provided that they do not contain functional groups that poison conventional Ziegler catalysts. Preferably such organic moieties do not contain active hydrogen, i.e., those sufficiently active to react with the Zerewitinoff reagent.

In order to maximize catalyst efficiency, the catalyst is prepared by mixing the components of the catalyst in an inert liquid diluent in the following especially preferred order: organomagnesium compound, halide source, zinc compound, aluminum compound if required, and titanium compound or complex. However, the zinc compound, additional aluminum compound or both can be added as a separate side stream which comes into contact with the other components of the catalyst composition prior to entry into the polymerization reactor. Also the zinc compound, additional aluminum compound or both may be fed separately to the reactor where it or they only come into contact with the other catalyst components inside the reactor.

The foregoing catalyst components are combined in proportions sufficient to provide atomic ratios as previously mentioned.

In cases wherein neither the organomagnesium component nor the halide source contains aluminum, it is necessary to include in the total catalyst an aluminum compound such as an alkyl aluminum compound, e.g., a trialkyl aluminum, an alkyl aluminum halide or an aluminum halide. If polymerization temperatures below 180° C. are employed, the atomic ratios of Al:Ti may be from about 0.1:1 to about 2000:1, preferably from 1:1 to about 200:1. However, when polymerization temperatures above 180° C. are employed, the aluminum compound is used in proportions such that the Mg:Al ratio is more than 0.3:1, preferably from 0.5:1 to 10:1, and Al:Ti ratio is less than 120:1, preferably less than 50:1. It is understood, however, that the use of very low amounts of aluminum necessitates the use of high purity solvents or diluents in the polymerization zone. Further, other components present in the zone should be essentially free of impurities which react with aluminum alkyls. Otherwise, additional quantities of an organometallic compound as previously described, preferably an organoaluminum compound, must be used to react with such impurities. Moreover, it is understood that in the catalyst the aluminum compound should be in the form of trialkyl aluminum or alkyl aluminum halide provided that the alkyl aluminum halide is substantially free of alkyl aluminum dihalide.

The foregoing catalytic reaction is preferably carried out in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about −100° to about 200° C., preferably from about 0° to about 100° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about 0° to about 300° C., preferably at solution polymerization temperatures, e.g., from about 130° to about 250° C. for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally in the polymerization process, a carrier which may be an inert organic diluent or solvent or excess monomer is employed. In order to realize the full benefit of the high efficiency catalyst of the present invention, care must be taken to avod oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 to about 1000 psig, especially from about 100 to about 700 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures througout the polymerization zone.

In order to optimize catalyst yields in the polymerization of ethylene, it is preferable to maintain an ethylene concentration in the solvent in the range of from about 1 to about 10 weight percent, most advantageously from about 1.2 to about 2 weight percent. To achieve this, when an excess of ethylene is fed into the system, a portion of the ethylene can be vented.

Hydrogen can be employed in the practice of this invention to control the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present and thus removing the heat of reaction. In any event adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a relatively broad molecular weight distribution.

The following examples are given to illustrate the inventions, and should not be construed as limiting its scope. All percentages are by weight and all parts are by molar or atomic ratio unless otherwise indicated.

In the following examples, the melt index values $I_2$ and $I_{10}$ were determined by ASTM D 1238-70 and the density values were determined by ASTM D 1248.

EXAMPLES 1-8 and COMPARATIVE EXPERIMENTS A and B

A. Preparation of Anhydrous $MgCl_2$

To 39.68 ml (0.025 moles) of 0.63 M di-n-hexyl magnesium was added 460.32 ml of 2,2,4-trimethylpentane (isooctane). Anhydrous electronic grade HCl was passed through the solution until a light yellow color persisted. Excess HCl was stripped from the mixture by passing dry $N_2$ through the solution.

B. Preparation of the Catalyst Composition

The catalyst composition was prepared by adding with stirring under a nitrogen atmosphere to a 4-ounce (118.28 cc) serum bottle the following components in the following order:

| | |
|---|---|
| (87.40 -x-y) | ml of 2,2,4-trimethylpentane |
| 12.0 | ml of 0.05 M $MgCl_2$ as prepared above |
| x | ml of 0.85 M diethyl zinc (DEZ) |
| y | ml of 1.00 M triethyl aluminum (ATE) |
| 0.60 | ml of 0.025 M tetra-isopropyl titanate (Ti(OiPr)$_4$) |
| 100.0 | ml |

The temperature of the serum bottles was maintained at ambient temperature (about 22° C.). Depending on the ratio of the concentration of DEZ to ATE, the catalyst was observed to darken over a period of about 10 minutes. After this time, there was no significant change in catalyst color.

The quantities of DEZ and ATE and the atomic ratios of the catalyst components are given in the following Table I.

TABLE I

| Example and Comparative Experiment Number | x ml | y ml | ATOMIC RATIO | | | |
|---|---|---|---|---|---|---|
| | | | Mg:Ti | Zn:Ti | Al:Ti | *XsCl:Al |
| 1 | 1.32 | 0.15 | 40:1 | 75:1 | 10:1 | 0.01:1 |
| 2 | 1.32 | 0.30 | 40:1 | 75:1 | 20:1 | 0.005:1 |
| 3 | 0.88 | 0.75 | 40:1 | 50:1 | 50:1 | 0.002:1 |

TABLE I-continued

| Example and Comparative Experiment Number | x ml | y ml | ATOMIC RATIO | | | |
|---|---|---|---|---|---|---|
| | | | Mg:Ti | Zn:Ti | Al:Ti | *XsCl:Al |
| 4 | 0.88 | 0.30 | 40:1 | 50:1 | 20:1 | 0.005:1 |
| 5 | 0.88 | 0.375 | 40:1 | 50:1 | 25:1 | 0.004:1 |
| A | 0 | 0.75 | 40:1 | 0:1 | 50:1 | 0.002:1 |
| 6 | 0.88 | 0.30 | 40:1 | 50:1 | 20:1 | 0.005:1 |
| 7 | 0.88 | 0.30 | 40:1 | 50:1 | 20:1 | 0.005:1 |
| 8 | 1.32 | 0.15 | 40:1 | 75:1 | 10:1 | 0.01:1 |
| B | 0 | 0.75 | 40:1 | 0:1 | 50:1 | 0.002:1 |

**XsCl = excess chloride

C. Polymerization (Ex. 1-5 and Comparative Experiment A)

A stirred batch reactor containng 2 liters of 2,2,4-trimethylpentane (isooctane) was heated to 150° C. The solvent vapor pressure was 40 psig. To this was added 10 psig of hydrogen and 130 psig of ethylene for a total reactor pressure of 180 psig. An amount of the above catalyst was injected into the reactor (10 ml=0.0015 m Moles Ti), and the reactor pressure was maintained constant at 180 psig with ethylene. The total reaction time was 30 minutes. The quantities of catalyst and polymerization results are given in Table II.

D. Polymerization (Ex. 6-8 and Comparative Experiment A)

The catalyst preparation was identical to that given above. In these examples, the polymerization was conducted at 80° C. (slurry conditions). The solvent vapor pressure was 0 psig and 80 psig of hydrogen was added. To this was added 120 psig of ethylene for a total reactor pressure of 200 psig. All other parameters are the same. The results of these examples are given in Table II.

When comparing two samples of polymer, it is necessary for the melt indices ($I_2$) of the samples to be similar since the $I_{10}/I_2$ ratio is inversely proportional to the melt index. The value of the $I_{10}/I_2$ ratio is a reflection of the molecular weight distribution of the polymer since a broad molecular weight distribution is indicated by a large $I_{10}/I_2$ ratio while a small ratio indicates a relatively narrow distribution.

A broad distribution is desirable in film resins because the broadened distribution leads to higher polymer melt strengths which in turn lead to improved film fabrication conditions. In addition, a broad molecular weight distribution is desirable in injection molding resins due to improved rheological (i.e., processing) properties.

In Table II, comparative experiment A can be compared with examples 1 and 8 on the basis of similar melt indices. It can be seen that from 2.5 to 4.5 $I_{10}/I_2$ units of broadening results using the improved catalyst of this invention. Comparative experiment B can be compared with examples 6 and 7. The amount of broadening observed is 2.4 and 3.5 $I_{10}/I_2$ units, respectively. The resins produced using this novel catalyst system thus show more desirable properties for film and injection molding applications than the resins made by the catalysts in the comparative experiments.

TABLE II

| Example and Comparative Experiment Number | Quantity of Catalyst ml | Polymer Yield grams | Catalyst Efficiency g Polymer/g Ti × $10^6$ | MELT INDEX $I_2$ | $I_{10}$ | $I_{10}/I_2$ | Peak MW[1] | $M_w/M_n$[2] | Density g/cc |
|---|---|---|---|---|---|---|---|---|---|
| 1 | 15 | 129 | 1.20 | 0.46 | 6.77 | 14.72 | 42,500 | 4.29 | 0.9613 |
| 2 | 10 | 91 | 1.27 | 0.91 | 9.76 | 10.73 | N.D.[3] | N.D. | 0.9608 |
| 3 | 10 | 131 | 1.82 | 1.21 | 13.70 | 11.32 | N.D. | N.D. | 0.9640 |
| 4 | 25 | 123 | 0.68 | 1.18 | 11.80 | 10.00 | 32,000 | 7.09 | 0.9622 |
| 5 | 10 | 108 | 1.50 | 1.29 | 15.53 | 12.04 | N.D. | N.D. | 0.9637 |
| A | 10 | 164 | 2.28 | 0.47 | 5.75 | 12.23 | N.D. | N.D. | 0.9605 |
| 6 | 25 | 122 | 0.68 | 0.29 | 4.36 | 15.03 | 33,500 | 5.72 | 0.9603 |
| 7 | 25 | 91 | 0.51 | 0.32 | 5.18 | 16.19 | 30,900 | 10.54 | 0.9609 |
| 8 | 25 | 96 | 0.42 | 0.42 | 7.00 | 16.67 | 34,000 | 9.02 | 0.9614 |
| B | 30 | 132 | 0.61 | 0.35 | 4.42 | 12.63 | N.D. | N.D. | 0.9589 |

[1]Peak molecular weight = the most frequently occurring molecular weight of all polymer species present as weight average molecular weight determined by gel permeation chromatography.
[2]$M_w/M_n$ = weight average molecular weight divided by the number average molecular weight asdetermined by gel permeation chromatography.
[3]N.D. = not determined.

EXAMPLES 9–15 and COMPARATIVE EXPERIMENT C

A. Catalyst Preparation

The catalyst composition was prepared by adding with stirring under a nitrogen atmosphere to a 4-ounce (118.28 cc) serum bottle the following components in the following order:

| | | |
|---|---|---|
| (97.53 -x-y) | ml of 2,2,4-trimethylpentane | |
| 0.97 | ml of 0.63 M n-butyl ethyl magnesium (BEM) | |
| 8.90 | ml of 0.50 M tin (IV) chloride (SnCl$_4$) | |
| x | ml of 0.85 M diethyl zinc (DEZ) | |
| y | ml of 1.00 M triethyl aluminum (ATE) | |
| 0.60 | ml of 0.025 M tetraisopropyl titanate (Ti(OiPr)$_4$) | |
| 100.00 | ml | |

The order of addition in this case is extremely important since it is necessary to convert the BEM to MgCl$_2$ with the SnCl$_4$ before adding the other components. When SnCl$_4$ is employed as the halide source, it is necessary to add a small amount, at least 1 atom of Al per atom of Ti, of an aluminum compound before adding the titanium source in order to form an active catalyst.

The quantities of DEZ and ATE and the atomic ratios of the catalyst components are given in the following Table III.

TABLE III

| Example and Comparative Experiment Number | x ml | y ml | ATOMIC RATIO Mg:Ti | Zn:Ti | Al:Ti | *XsCl:Al |
|---|---|---|---|---|---|---|
| 9 | 0.88 | 0.75 | 40:1 | 50:1 | 50:1 | 0.8:1 |
| 10 | 0.44 | 0.75 | 40:1 | 25:1 | 50:1 | 0.8:1 |
| 11 | 0.18 | 0.75 | 40:1 | 10:1 | 50:1 | 0.8:1 |
| 12 | 1.32 | 0.30 | 40:1 | 75:1 | 20:1 | 2:1 |
| 13 | 1.32 | 0.75 | 40:1 | 75:1 | 50:1 | 0.8:1 |
| 14 | 0.88 | 0.30 | 40:1 | 50:1 | 20:1 | 2:1 |
| 15 | 0.88 | 0.49 | 40:1 | 50:1 | 27:1 | 1.5:1 |
| C | 0 | 0.75 | 40:1 | 0.1 | 50:1 | 0.8:1 |

*XsCl = excess chloride

B. Polymerization

Each of the catalysts were employed to polymerize ethylene employing the conditions for Examples 1–5. The results are given in Table IV.

In Table IV, comparative experiment C can most closely be compared with example 10. Again there is about 1.2 $I_{10}/I_2$ units of broadening at this higher melt index value. Thus, the resin from example 10 shows more desirable film and injection molding properties than the resin in comparative experiment C.

TABLE IV

| Example and Comparative Experiment Number | Quantity of Catalyst ml | Polymer Yield grams | Catalyst Efficiency g Polymer/g Ti × $10^6$ | MELT INDEX $I_2$ | $I_{10}$ | $I_{10}/I_2$ | Peak MW[1] | $M_w/M_n$[2] | Density g/cc |
|---|---|---|---|---|---|---|---|---|---|
| 9 | 15 | 148 | 1.37 | 1.16 | 12.15 | 10.47 | 34,800 | 4.5 | 0.9638 |
| 10 | 10 | 156 | 2.17 | 1.84 | 18.73 | 10.18 | 31,900 | 3.12 | 0.9641 |
| 11 | 6.7 | 141 | 2.94 | 1.29 | 12.10 | 9.38 | N.D.[3] | N.D. | 0.9633 |
| 12 | 40 | 92 | 0.32 | 1.57 | 17.69 | 11.27 | 25,900 | 6.22 | 0.9662 |
| 13 | 6.7 | 83 | 1.73 | 1.09 | 11.50 | 10.55 | 35,200 | 4.59 | 0.9639 |
| 14 | 6.5 | 66 | 0.14 | 1.82 | 20.71 | 11.38 | 22,600 | 6.35 | 0.9671 |
| 15 | 35 | 111 | 0.44 | 0.98 | 10.37 | 10.58 | 31,100 | 6.43 | 0.9640 |
| C | 15 | 180 | 1.67 | 2.94 | 25.88 | 8.80 | N.D. | N.D. | 0.9644 |

[1]Peak molecular weight = the most frequently occurring molecular weight of all polymer species present as weight average molecular weight determined by gel permeation chromatography.
[2]$M_w/M_n$ = weight average molecular weight divided by the number average molecular weight asdetermined by gel permeation chromatography.
[3]N.D. = not determined.

The catalyst composition was also employed in a continuous operation. The following examples are given to illustrate possible uses of the invention in a continuous process.

EXAMPLES 16-21

A. Catalyst Preparation

The catalyst composition was prepared by adding with stirring under a nitrogen atmosphere to a 30-liter catalyst vessel the following components in the following order:

Isopar® E*
40 parts magnesium alkyl (n-butyl-sec-butyl Mg or di-n-hexyl Mg)
82 parts anhydrous hydrogen chloride (HCl)
1 part tetraisopropyl titanate (Ti(OiPr)$_4$)
24 parts triethylaluminum (ATE)
24 parts diethyl zinc (DEZ)

*The Isopar® E was employed in a quantity which provided 0.000132 parts by weight of Ti per part by weight of catalyst composition.

The order of addition is important since magnesium alkyls can over reduce the Ti(OiPr)$_4$. Also, if DEZ is present when the HCl is added, it will fall out of solution as the metal chloride.

B. Polymerization

A spherical, 50-gallon, constant-stirred vessel with ethylene feed to the bottom was used as the reactor. Isopar® E, a mixture of $C_8$-$C_{12}$ saturated hydrocarbons, was used as the solvent. Reactor temperature was maintained at 190° C., ±2° C., and the reactor pressure was maintained at 500 psig throughout the runs. Hydrogen was added as a molecular weight control. Residence time for the catalyst in the reactor was 50 minutes. The catalyst efficiency and polymerization results are given in Table V.

EXAMPLES 22-31

A. Catalyst Preparation

The catalyst composition was prepared by adding with stirring under a nitrogen atmosphere to a 30-liter catalyst vessel the following components in the following order:

Isopar® E*
40 parts magnesium alkyl (n-butyl-sec-butyl Mg or di-n-hexyl Mg)
82 parts anhydrous hydrogen chloride (HCl)
1 part tetraisopropyl titanate (Ti(OiPr)$_4$)
18 parts triethylaluminum (ATE)

*The Isopar® E was employed in a quantity which provides 0.000132 parts by weight of Ti per part by weight of catalyst composition.

Again the order of addition is important for the same reasons given for Examples 16-21.

The DEZ is placed in a second vessel and pumped so that it interacts with the above prepared catalyst at the time it enters the polymerization reactor. This is accomplished by employing dual catalyst feed lines which come together just prior to entering the reactor. In this manner, the amount of DEZ entering the reactor, and therefore the ratio of Zn:Ti and Zn:Al, can be varied independently of the catalyst make-up.

B. Polymerization

Each of the catalysts were employed to polymerize ethylene using the conditions for Examples 16-21. The results are given in Table V.

COMPARATIVE EXPERIMENTS D-H

The catalyst of Examples 22-31 was employed using the polymerization procedure of Examples 16-21, i.e., no zinc compound was employed. The results are given in Table V.

The following comparisons can be made on the continuous scale samples based on melt index. Comparative experiment D can be compared with example 16. The amount of broadening for example 16 is almost 5 $I_{10}/I_2$ units. Another indication of broadening is the fact that the melt index of the two samples is nearly identical, but the peak molecular weight of example 16 is lower, indicating more high molecular weight material is present.

Comparative experiment E can be compared with examples 22 and 27. The amount of $I_{10}/I_2$ broadening was 1.3 and 3.2 units, respectively. In both cases the peak molecular weight for the examples was much lower than for the comparative experiment, indicating more high molecular weight material present.

Comparative experiment F may be compared with examples 19, 26 and 29. The amount of broadening was 0.1, 0.4 and 2.0 $I_{10}/I_2$ units respectively, with the peak molecular weights again being lower for the examples.

Comparative experiment G can be compared with examples 20 and 24. The amount of broadening was 0.5 and 0.7 $I_{10}/I_2$ units, respectively.

Comparative experiment H can be compared with example 21. The $I_{10}/I_2$ broadening was 0.2 units.

The examples in Table V would all show superior film and injection molding properties when compared to the comparative experiments also listed in Table V.

TABLE V

| Example and Comparative Experiment Number | Catalyst Efficiency g Polymer/g Ti × 10$^6$ | Mg:Ti | Zn:Ti | Al:Ti | **XsCl:Al | $I_2$ | $I_{10}$ | $I_{10}/I_2$ | Peak MW$^1$ | $M_w/M_n^2$ | Density g/cc |
|---|---|---|---|---|---|---|---|---|---|---|---|
| 16 | 0.85 | 40:1 | 18:1 | 24:1 | 0.08:1 | 0.70 | 11.06 | 15.80 | 29,500 | 8.37 | 0.9596 |
| 17 | 0.44 | 40:1 | 18:1 | 24:1 | 0.08:1 | 3.04 | 29.91 | 9.84 | 26,900 | 6.45 | 0.9615 |
| 18 | 0.64 | 40:1 | 18:1 | 24:1 | 0.08:1 | 9.71 | 75.35 | 7.76 | 22,600 | 4.56 | 0.9634 |
| 19 | 0.80 | 40:1 | 18:1 | 24:1 | 0.08:1 | 14.85 | 107.82 | 7.26 | 22,000 | 4.39 | 0.9634 |
| 20 | 0.79 | 40:1 | 18:1 | 24:1 | 0.08:1 | 30.49 | 209.23 | 6.86 | 20,200 | 2.98 | 0.9648 |
| 21 | 0.88 | 40:1 | 18:1 | 24:1 | 0.08:1 | 79.51 | 489.2 | 6.15 | 17,200 | 3.25 | 0.9670 |
| 22 | 0.64 | 40:1 | 7.5:1 | 14:1 | 0.14:1 | 2.15 | 21.33 | 9.92 | 26,300 | 6.02 | 0.9583 |
| 23 | 0.64 | 40:1 | 11.2:1 | 14:1 | 0.14:1 | 3.00 | 28.82 | 9.61 | 29,100 | 4.42 | 0.9599 |
| 24 | 0.53 | 40:1 | 12:1 | 14:1 | 0.14:1 | 33.19 | 235.27 | 7.09 | N.D.* | N.D. | 0.9655 |
| 25 | 0.42 | 40:1 | 14.8:1 | 14:1 | 0.14:1 | 7.96 | 72.32 | 9.09 | 22,400 | 3.44 | 0.9644 |
| 26 | 0.57 | 40:1 | 19:1 | 14:1 | 0.14:1 | 12.05 | 93.87 | 7.51 | 23,300 | 4.57 | 0.9605 |
| 27 | 0.64 | 40:1 | 21.3:1 | 14:1 | 0.14:1 | 2.05 | 24.24 | 11.82 | 25,800 | 5.60 | 0.9600 |
| 28 | 0.66 | 40:1 | 21.3:1 | 14:1 | 0.14:1 | 26.23 | 201.76 | 7.69 | 20,200 | 3.47 | 0.9672 |
| 29 | 0.38 | 40:1 | 25.8:1 | 14:1 | 0.14:1 | 10.73 | 98.46 | 9.18 | 19,600 | 5.45 | 0.9643 |
| 30 | 0.67 | 40:1 | 27.7:1 | 14:1 | 0.14:1 | 6.91 | 67.19 | 9.72 | 21,800 | 6.90 | 0.9584 |
| 31 | 0.58 | 40:1 | 29.5:1 | 14:1 | 0.14:1 | 29.90 | 220.97 | 7.38 | 19,300 | 3.46 | 0.9680 |
| D | N.D. | 40:1 | 0:1 | 14:1 | 0.14:1 | 0.69 | 7.57 | 10.97 | 32,800 | 11.94 | 0.9611 |
| E | N.D. | 40:1 | 0:1 | 14:1 | 0.14:1 | 1.84 | 15.90 | 8.64 | 33,700 | 4.74 | 0.9595 |
| F | N.D. | 40:1 | 0:1 | 14:1 | 0.14:1 | 12.19 | 86.94 | 7.13 | 25,600 | 4.56 | 0.9658 |

TABLE V-continued

| Example and Comparative Experiment Number | Catalyst Efficiency g Polymer/g Ti × 10⁶ | Mg:Ti | Zn:Ti | Al:Ti | **XsCl:Al | $I_2$ | $I_{10}$ | $I_{10}/I_2$ | Peak MW[1] | $M_w/M_n$[2] | Density g/cc |
|---|---|---|---|---|---|---|---|---|---|---|---|
| G | N.D. | 40:1 | 0:1 | 14:1 | 0.14:1 | 38.83 | 245.39 | 6.32 | 21,100 | 3.58 | 0.9661 |
| H | N.D. | 40:1 | 0:1 | 14:1 | 0.14:1 | 84.18 | 493.74 | 5.92 | 17,400 | 3.23 | 0.9704 |

*N.D. = not determined
**XsCl = excess chloride
[1] Peak molecular weight = the most frequently occurring molecular weight of all polymer species present as weight average molecular weight determined by gel permeation chromatography.
[2] $M_w/M_n$ = weight average molecular weight divided by the number average molecular weight as determined by gel permeation chromatography.

EXAMPLES 32–42

A. Catalyst Preparation

The catalyst composition was prepared by adding with stirring under a nitrogen atmosphere to a 50-gallon catalyst vessel the following components in the following order:

Isopar ® E*
40 parts of n-butyl-sec-butyl magnesium
82 parts of anhydrous hydrogen chloride (HCl)
1 part of tetraisopropyl titanate (Ti(OiPr)₄)
20 parts of diethyl zinc (DEZ)

*The Isopar ® E was employed in a quantity which provided 0.000132 parts by weight of Ti per part by weight of catalyst composition.

The order of addition is important as has been previously discussed.

In a separate 10-gallon vessel, a 0.15 weight percent solution of ATE was prepared by diluting 1 part by weight of 15% ATE with 99 parts by weight of solvent. This solution was side-streamed into the reactor along with the catalyst composition to serve as the co-catalyst. By side-streaming the ATE, the catalyst efficiency can be optimized and the ratio of Al:Ti or Al:Zn can be varied independently of the catalyst make-up. For these runs, the ATE level was optimized at approximately 15:1 Al:Ti.

B. Polymerization

A cylindrical, 25-gallon, constant-stirred vessel with separate ethylene and catalyst feed to the bottom was used as the reactor. Isopar ® E, a mixture of $C_8$–$C_{12}$ saturated hydrocarbons, was used as the solvent with a solvent flow of 700 pounds per hour. Reactor temperature was maintained at 190° C., ±2° C., and the reactor pressure was maintained at 500 psig throughout the runs. Ethylene conversion ranged from 84–95% with a production rate of 85±5 pounds per hour. Hydrogen was added as a molecular weight control. Residence time for the catalyst in the reactor was 10 minutes. The catalyst efficiency was from 0.50 to 0.60 $\overline{M}$ # polymer/# Ti. Polymerization results are given in Table VI.

COMPARATIVE EXPERIMENTS I-O

The catalyst of Examples 32–42 was employed except that the 20 parts of diethyl zinc was not added to the catalyst composition. Polymerization conditions were also identical to those of the preceding examples 32–42. When the ATE side-stream was optimized (again at ~15:1 Al:Ti), the catalyst efficiency was 0.75 to 1.0 M # polymer/# Ti. Polymerization results are given in Table VI.

For this example of a continuous process, the following comparisons can be made. Comparative experiment I can be compared to example 32, with #32 showing 4.5 $I_{10}/I_2$ units of broadening. Example 34 shows 5 $I_{10}/I_2$ units of broadening when compared with comparative experiment J, while example 37 is 2.8 $I_{10}/I_2$ units broader than comparative experiment K. There is a difference of 1.7 $I_{10}/I_2$ units between example 38 and comparative experiment L. Comparative experiment M can be compared to example 39, with example 39 being 1.8 $I_{10}/I_2$ units broader. Example 42, when compared with comparative experiment N, is seen to be 1.1 $I_{10}/I_2$ units broader.

TABLE VI

| Example and Comparative Experiment Number | $I_2$ | $I_{10}$ | $I_{10}/I_2$ |
|---|---|---|---|
| 32 | 0.73 | 9.87 | 13.52 |
| 33 | 1.08 | 15.20 | 14.07 |
| 34 | 1.26 | 15.91 | 12.63 |
| 35 | 1.70 | 19.02 | 11.19 |
| 36 | 2.17 | 23.30 | 10.74 |
| 37 | 2.26 | 23.46 | 10.38 |
| 38 | 5.89 | 52.15 | 8.85 |
| 39 | 8.83 | 76.25 | 8.64 |
| 40 | 9.73 | 80.71 | 8.29 |
| 41 | 10.33 | 81.26 | 7.87 |
| 42 | 16.19 | 126.01 | 7.78 |
| I | 0.84 | 7.62 | 9.02 |
| J | 1.36 | 12.29 | 9.04 |
| K | 2.51 | 19.00 | 7.57 |
| L | 4.81 | 34.48 | 7.17 |
| M | 7.73 | 53.23 | 6.89 |
| N | 18.27 | 121.82 | 6.67 |
| O | 36.10 | 238.70 | 6.61 |

We claim:

1. A catalytic reaction product of
(A) a tetravalent titanium compound represented by the formula $TiX_n(OR)_{4-n}$ wherein X is a halogen, R is an alkyl or an aryl group having from 1 to 12 carbon atoms and n has a value of 0 to 4;
(B) an anhydrous divalent zinc compound represented by the formulas $Zn(Q)_m$, RZnX and $R_2Zn$ wherein each R is independently an alkyl or an aryl group having from 1 to about 12 carbon atoms, X is a halogen, Q is an anion selected from halide, hydroxide, carboxylate, carbonate, nitrate, sulfate, or mixtures thereof and m is two divided by the valence of Q;
(C) an organomagnesium component selected from (1) an organomagnesium compound or (2) a complex of an organomagnesium compound and an organometallic compound in an amount sufficient to solubilize the organomagnesium compound in a hydrocarbon solvent, said organomagnesium compound and said complex being represented respectively by the following formulas $MgR''_2$ and $MgR''_2 \cdot xMR''_y$ wherein each R'' is independently a hydrocarbyl group having from 1 to 20 carbon atoms; M is a metal selected from Al, Zn, Si, Sn, B and P; y is the number of hydrocarbyl groups and corresponds to the valency of M and x is about 0.001 to 10 and (D) a halide source selected from (1) an active non-metallic halide, said non-metallic halide corresponding to the formula R'X wherein R' is hydrogen or a hydrocarbyl group such that the hydrocarbyl halide is at least as active as sec-butyl chloride and does not poison the catalyst and X is halogen or (2) a metallic halide corresponding to the formula $MR_{y-a}X_a$ wherein M is a metal of Group IIB, IIIA or IVA of Mendeleev's Periodic Table of Elements, R is a monovalent hydrocarbyl radical, X is halogen, y is a number corresponding to the valence of M and a is a number of 1 to y; provided that the proportions of the foregoing components of said catalytic reaction product being such that the atomic ratio of Mg:Ti is from about 1:1 to about 2000:1, the atomic ratio of Al:Ti is from about 0.1:1 to about 2000:1, the atomic ratio of Zn:Ti is from about 0.01 to about 500:1, the atomic ratio of excess X:Al is from about 0.0005:1 to about 10:1; and further provided that when the organomagnesium component and/or the halide source provides insufficient quantities of aluminum, there is also present an aluminum compound represented by the formula $AlR_{y'}X_{y''}$ wherein R and X are as defined above and y' and y'' each have a value of from zero to three with the sum of y' and y'' being three.

2. The product of claim 1 wherein the anhydrous divalent zinc compound is a dialkyl zinc, an alkyl zinc halide or a zinc halide, Component A is a tetravalent titanium compound and wherein the atomic ratio of Mg:Ti is from about 2:1 to about 200:1, the atomic ratio of Al:Ti is from about 0.5:1 to about 200:1, the atomic ratio of Zn:Ti is from about 0.5:1 to about 100:1 and the atomic ratio of excess X:Al is from about 0.002:1 to about 2:1.

3. The product of claim 2 wherein the atomic ratio of Mg:Ti is from about 5:1 to about 75:1, the atomic ratio of Al:Ti is from about 1:1 to about 75:1, the atomic ratio of Zn:Ti is from about 0.5:1 to about 75:1 and the atomic ratio of excess X:Al is from about 0.01:1 to about 1.4:1.

4. The product of claim 3 wherein the organomagnesium compound is a dihydrocarbyl magnesium.

5. The product of claim 3 wherein the organomagnesium component is a complex of dialkyl magnesium and a trialkyl aluminum wherein the atomic ratio of Mg to Al in the organomagnesium component is within the range from about 0.3:1 to about 1000:1.

6. The product of claim 3 wherein the tetravalent titanium compound is tetraisopropoxy titanium.

7. The product of claims 1, 2, 3, 4, 5 or 6 wherein the anhydrous divalent zinc compound is a dialkyl zinc or an alkyl zinc halide wherein each alkyl group independently has from about 1 to about 12 carbon atoms and the halide is chloride or bromide and the components are added in the order (C), (D), (B), aluminum compound, if required, and (A).

8. The product of claims 1, 2, 3, 4, 5 or 6 wherein the anhydrous divalent zinc compound is a dialkyl zinc or an alkyl zinc halide wherein each alkyl group independently has from about 1 to about 12 carbon atoms and the halide is chloride or bromide and the components are added in the order (C), (D), (A), aluminum compound, if required, and (B) and provided that the halide source, (D), is other than a tin compound.

9. The product of claims 1, 2, 3, 4, 5 or 6 wherein the anhydrous divalent zinc compound is a dialkyl zinc or an alkyl zinc halide wherein each alkyl group independently has from about 1 to about 12 carbon atoms and the halide is chloride or bromide and the components are added in the order (C), (D), aluminum compound, if required, (A), and (B).

10. The product of claim 7 wherein the anhydrous divalent zinc compound is diethyl zinc.

11. The product of claim 8 wherein the anhydrous divalent zinc compound is diethyl zinc.

12. The product of claim 9 wherein the anhydrous divalent zinc compound is diethyl zinc.

13. The product of claim 9 wherein component (B) is fed as a separate stream to a reactor employing the catalytic reaction product.

14. The product of claim 9 wherein component (B) is fed as a separate stream to a stream containing the other components just prior to entry into a reactor employing the catalytic reaction product.

* * * * *

UNITED STATES PATENT AND TRADEMARK OFFICE
CERTIFICATE OF CORRECTION

PATENT NO. : 4,238,355          PAGE 1 OF 2
DATED : December 9, 1980
INVENTOR(S) : Randall S. Shipley, Donald F. Birkelbach, and Kirby Lowery, Jr.

It is certified that error appears in the above-identified patent and that said Letters Patent are hereby corrected as shown below:

Under "Reference Cited" for 4,120,820; change "Birkeleach" to --Birkelbach--.

Under "ABSTRACT", line 10; change "of" to --or--.

Column 2, line 36; change "the" to --The--.

Column 2, line 52; change "element" to --elements--.

Column 3, line 40; change "inter" to --inert--.

Column 4, line 40; delete "," after "purple".

Column 8, line 8; change "avod" to --avoid--.

Column 10, footnote under Table I; change "**XsCl" to --*XsCl--.

Column 10, line 19; change "containng" to --containing--.

UNITED STATES PATENT AND TRADEMARK OFFICE
CERTIFICATE OF CORRECTION

PATENT NO. : 4,238,355

DATED : December 9, 1980

INVENTOR(S) : Randall S. Shipley, Donald F. Birkelbach, and Kirby Lowery, Jr.

It is certified that error appears in the above-identified patent and that said Letters Patent are hereby corrected as shown below:

Column 11, Footnote 2 under Table II; change "asdetermined" to --as determined--.

Column 11, line 33; change "8.90" to --0.90--.

Column 12, Footnote 2 under Table IV; change "asdetermined" to --as determined--.

Signed and Sealed this

Sixteenth Day of June 1981

[SEAL]

Attest:

RENE D. TEGTMEYER

Attesting Officer

Acting Commissioner of Patents and Trademarks